United States Patent [19]
Delignieres

[11] 3,961,683
[45] June 8, 1976

[54] METHOD FOR DETERMINING THE SHAPE OF AN UNDERGROUND CAVITY AND THE POSITION OF THE SURFACE SEPARATING TWO MEDIA CONTAINED THEREIN AND DEVICE FOR CARRYING OUT SAID METHOD

[75] Inventor: Robert Delignieres, Mareil-Marly, France

[73] Assignee: Institut Francais du Petrole, des Carburants et Lubrifiants, France

[22] Filed: June 21, 1973

[21] Appl. No.: 371,962

[30] Foreign Application Priority Data
June 22, 1972 France .............................. 72.22694

[52] U.S. Cl. .............................. 181/102; 181/104; 181/105; 340/15.5 TN
[51] Int. Cl.² .......................................... G01V 1/40
[58] Field of Search ............... 340/15.5 BH, 15.5 TI, 340/15.5 TN; 181/.5 BE, .5H, .5 ED, 102, 104, 105; 73/151

[56] References Cited
UNITED STATES PATENTS

| | | |
|---|---|---|
| 2,595,241 | 5/1952 | Goble .............................. 181/.5 BE |
| 3,406,779 | 10/1968 | Zemanek, Jr. et al. .............. 181/104 |
| 3,425,507 | 2/1969 | Caldwell .......................... 181/.5 ED |
| 3,437,834 | 4/1969 | Schwartz ..................... 340/15.5 TN |
| 3,467,875 | 9/1969 | Engle ............................. 340/15.5 TN |
| 3,614,891 | 10/1971 | Nolte ............................... 181/.5 BE |
| 3,629,832 | 12/1971 | Vogel .......................... 340/15.5 TN |
| 3,687,218 | 9/1972 | Ritter ................................ 181/.5 H |

*Primary Examiner*—Richard A. Farley
*Assistant Examiner*—H. A. Birmiel
*Attorney, Agent, or Firm*—Craig & Antonelli

[57] ABSTRACT

Method for determining the shape of an underground cavity and the location of the interface between two media contained therein by making use of a sonic sonde comprising performing, for each position of the sonde, a series of measurements of the time interval between the transmission of an ultrasonic wave from the sonde and the reception of the corresponding echo after reflection on the wall of the cavity, the selection from said measurements of one of those indicating substantially identical time intervals so as to eliminate the false echos and the determination of the average value of the propagation time of said selected echo for each different location of the sonde and for each direction of the transmitted waves.

15 Claims, 8 Drawing Figures

METHOD FOR DETERMINING THE SHAPE OF AN UNDERGROUND CAVITY AND THE POSITION OF THE SURFACE SEPARATING TWO MEDIA CONTAINED THEREIN AND DEVICE FOR CARRYING OUT SAID METHOD

This invention relates to a new method and a device whereby can be determined the shape of an underground cavity and the position of the surface separating two volumes of different substances contained in said cavity.

The device may be used particularly for determining the shape of an underground cavity for storing petroleum products, and its filling rate.

The prospection of an underground cavity is usually carried out by means of a sonic sonde, comprising one or more ultrasonic wave transmitters whose transmission axes are oriented in the direction of the walls of the cavity and one or more receivers of the waves reflected or diffused from said walls. The position of the latter with respect to the sonde location is determined by the travelling time of the ultrasonic waves. A known process for measuring the filling rate of a cavity consists generally of introducing thereinto radioactive floating members and of determining the position of these floating members by means of a sonic sonde lowered through a tubing.

The device according to this invention, provides means for determining by a purely acoustic method, on the one hand the shape of the cavity and, on the other hand, the level of the liquid contained therein.

The used method comprises measuring the travel time intervals between the transmission of at least one beam of acoustic pulses from a succession of different reference positions in the cavity, in the direction of different successive places of the walls, and the reception and the detection of the echos corresponding to the pulses reflected or diffused from the walls.

This method makes it possible to avoid false echos due to aleatory reflections or scattering in the mass of the one or more substances contained in the cavity and to detect with accuracy the echos corresponding to the reflections on the walls.

The method of the invention is remarkable in that it comprises, for one and the same relative position of each reference point with respect to each place of the walls, the performance of a plurality of measurements of the propagation time intervals, the selection of at least one echo corresponding to a propagation time interval whose detected value is substantially unchanged for each of the measurements carried out, said method further providing for the determination of the average value of the propagation time interval of the selected echo corresponding to the travel time of the pulses between each reference point and each place of the wall.

The selection of the echos may be carried out by detecting the number of received echos, as a function of the time separating the transmission from the reception of said pulses, after completion of the successive measurements and by comparing said number to a predetermined value at predetermined moments. The selection of the echos may also be carried out by comparing to a predetermined value, after completion, of the successive measurements, the number of echos respectively detected during each measurement over a series of constant time intervals, progressively shifted with respect to the time of transmission of each pulse.

Another characteristic of the method makes it possible to determine the position of the interface between two substances contained in an underground cavity by making use of the data obtained from a sonic sonde whose transmission axis is substantially parallel to the interface of said two substances.

It consists in determining the reference position at which is carried out the transmission and for which, when two echos have been selected during the preceding stage of echo selection, the ratio between the time interval separating the detection of the two echos and the propagation time interval corresponding to the first detected echo is substantially independent from said propagation time interval.

Other advantages of the method, as well as a non limitative example of embodiment of the device for carrying out said method, will be hereinafter described more in detail with reference to the accompanying drawings wherein:

FIG. 1 diagrammatically shows a cavity filled up with two different substances and in which is immersed a sonic sonde;

FIG. 2 diagrammatically shows the relative position of a transmission beam in the vicinity of the separation surface of two substances contained in a cavity;

FIG. 3 is a diagram illustrating a non-limitative example of embodiment for carrying out the method;

FIG. 4 diagrammatically shows a system for generating signals forming time scales;

FIG. 5 diagrammatically shows a portion of the device for selecting echoes during the plurality of the measurements carried out;

Figure 1:
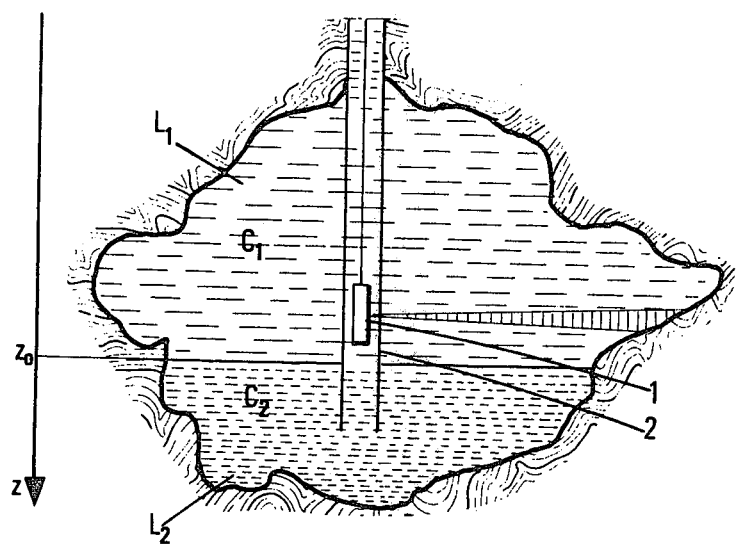

The cavity diagrammatically shown in FIG. 1 contains two substances $L_1$ and $L_2$ having different specific gravities in which the sound propagates at different velocities, respectively referred to as $c_1$ and $c_2$. In the case of an underground storage cavity, the two substances will consist for example of oil and water. Water having a higher specific gravity than that of oil, stands in the lower portion of the cavity. A tubing 2 is lowered into said cavity and its lower end communicates with the water body. In order to determine the shape of the cavity, a sonic sonde is lowered into the cavity through the tubing.

A transmitting-receiving transducer, whose transmission axis is at a predetermined angle with respect to the sonde axis, transmits ultra-sonic pulses in the direction of the cavity wall. The distance from the sonde to the wall is calculated on the basis of the time interval between the transmission of a pulse and the reception of the echo pulse. The study of the shape of the cavity is carried out in successive layers. The sonde is placed at any given depth $z$, transmission-reception cycles are performed for a certain number of successive angular positions of the transmission beam axis with respect to a reference direction. The passage from an angular position to another one may be carried out by means of a driving member usually defined as a step-by-step motor. $d$ being the distance between the sonde and the wall and $t_0$ and $t_1$ being respectively the transmission time of the pulse and the reception time of its echo, said values are interelated as follows:

$$\tau = t_1 - t_0 = 2d/c \qquad (1)$$

$c$ being the sound velocity through the propagation medium. For each successive transmission, there is made a recording, for example an optical recording of variable density. For each determined layer, the recording consists of a number of traces equal to the number of successive angular positions taken by the sonde.

Figure 2:
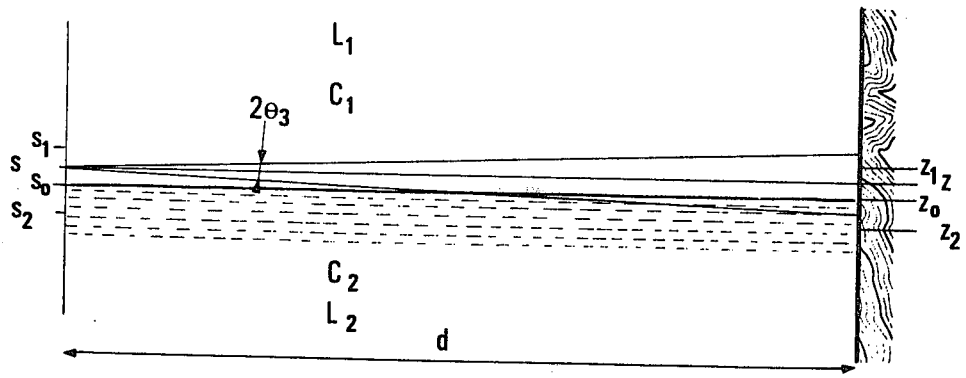

In the position shown in FIG. 2, the beam axis is within the substance $L_1$ at a depth close to the depth $z_0$ of the interface between the two substances $L_1$ and $L_2$. The transmission beam having apex angle $2\theta_3$ passes through the interface between the two substances. A portion thereof propagates through substance $L_1$ and another one partially through substance $L_2$. The sound velocities being different in these two substances, the transmitter-receiver senses two echos separated by an increasing time interval depending on the proportion of the travel covered by the waves through the second substance $L_2$.

This interval is maximum when a portion of the beam propagates entirely through said second substance, i.e. when the beam axis is tangent to the interface. For this position of the sonde, the two received echoes are separated by a time interval:

$$\Delta\tau = 2d \frac{(c_2 - c_1)}{c_1 c_2} \qquad (2)$$

The respective amplitude of said two echoes varies in accordance with the relative magnitude of the surface portions of the cavity wall which diffuse the energy transmitted through substances $L_1$ and $L_2$.

Two echoes are observed when all the successive positions of the sonde are located between two points $S_1$ and $S_2$ at respective depths $z_1$ and $z_2$, for which the intersection of the transmission cone with the wall is tangent to the interface between the two substances. Before and beyond the beam propagates through one or the other substance and a single echo is observed. The value of the depth $z_0$ of the interface is then checked by effecting the half-sum of th depths $z_1$ and $z_2$ at which appear double echoes. In order to eliminate the influence of false echoes, it can be checked that the two real echoes, corresponding to the actual reflections on the wall, are really shifted with respect to each other by a time interval $\Delta\tau$ according to the above-relationship (2) in which the distance $d$ is estimated on the base of a continuation with the preceding measurements carried out.

In order to enhance the correlation between the double echoes, several transmissions may be carried out for each angular position of the sonde and the separate echoes may be omitted in the recording.

The prospection of a cavity may be carried out, for example, by performing m successive horizontal sections at increasing or decreasing depths. For each section, $n$ acoustical prospections will be performed along $n$ different angular positions of the sonde, each prospection comprising I ($I \geq 2$) successive transmission-reception cycles; din, $m$ will designate the distance corresponding to the $i^{th}$ cycle at the section $m$ and with azimuth $n$.

At the end of the I transmission-reception cycles, there is selected at least one echo corresponding to a propagation time-interval $\tau\, i,n,m$, substantially unchanged at each measurement. Since the propagation time corresponding to each echo may slightly vary from one measurement to another, there is determined the average propagation time $\tau\, mn$ of the pulses whose echoes have been selected.

The recording of the echoes may be carried out continuously versus time. However, according to a preferred embodiment there will be determined the number of echoes respectively detected in the course of each measurement during a succession of constant intervals progressively shifted with respect to the transmission instant of each pulse.

The device for carrying out the method as hereinafter described, has the object of:
measuring each value of $\tau\, i,n,m$,
determining the correct value of $\tau\, n,m$ by eliminating the false echoes,
memorizing the value $$nm = \frac{1}{I} \sum_{i=1}^{I} \tau\, i,n,m$$

detecting the location of the interface, corresponding to the section, at depth $z_0$, which statistically produces the larger number of double echoes separated by the time interval $\Delta\tau$, and
memorizing all the successive data in order to make possible further checkings at a differed time in case of anomalies.

Figure 3:
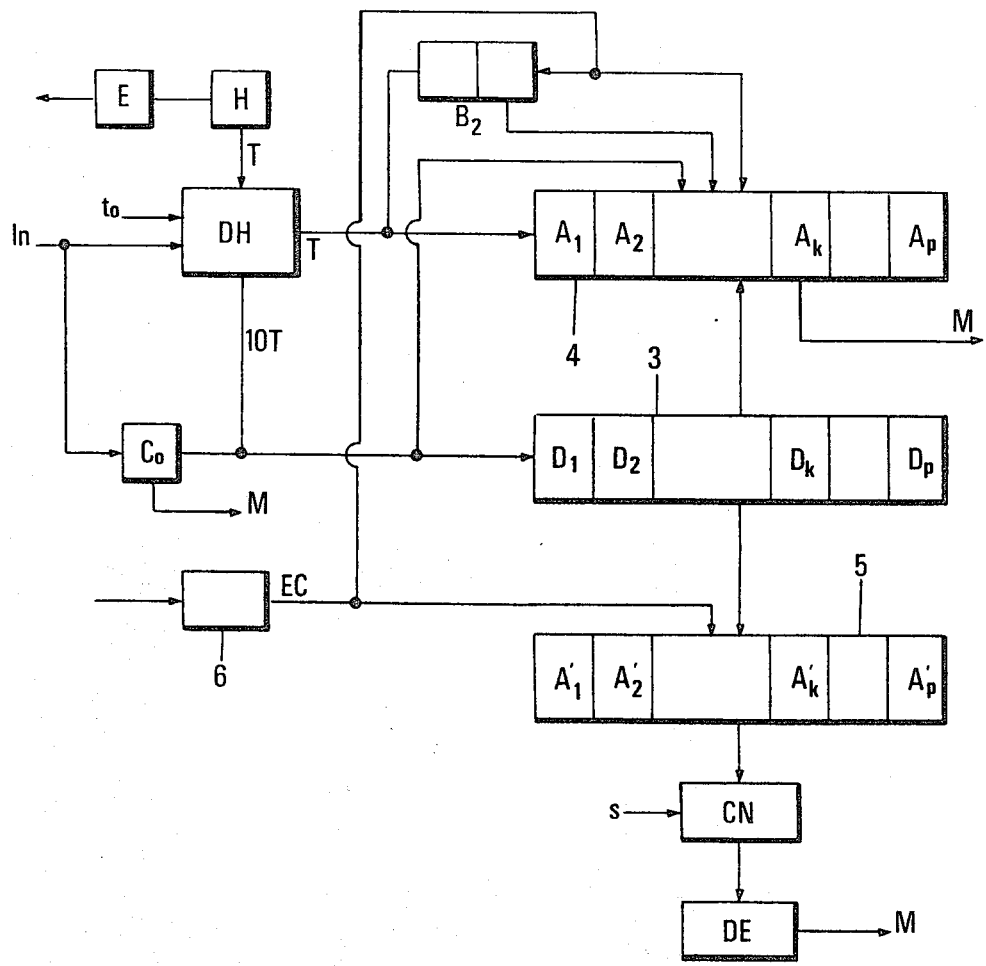

The device illustrated in FIG. 3 essentially comprises a system E for generating sonic pulses into the cavity, a receiving system 6 for the received echoes, a shift register 3, a member 4 for the counting and memorisation of the time intervals separating the respective instants of transmission and reception of the sonic pulses transmitted into the cavity, a member 5 for recording the number of detected echoes versus time and a member DH hereinafter termed as clock and providing for pulses separated by predetermined time intervals. This element DH receives from an element H a signal of period T and delivers a signal of period 10 T. T will be chosen, for example, equal to 1 ms. The shift register 3 comprises p elements $D_1, D_2 \ldots D_k \ldots D_p$ and the members 4 and 5 each comprises p assemblies respectively $A_1, A_2 \ldots A_k \ldots A_p$ and $A'_1, A'_2 \ldots A'_k \ldots A'_p$.

The operation of each assembly $A_k$ and $A'_k$ is controlled by a signal issued from the corresponding element $D_k$ when the latter is actuated. The shift register receives, from the clock DH, pulses of period 10 T, for example, which successively actuate the members $D_k$ of the shift register. The counting member 4 is connected to an output of the element DH from which are issued pulses at the frequency T.

The reception system 6 generates a pulse EC when the receiving transducer senses an echo. The member 5 for recording echoes is connected to the system 6. The pulses produced by the latter are registered in an element $A'_k$ of the member 5 whose operation is controlled by the shift register at the time of arrival of the corresponding echo. A counter $C_0$ is connected to the output of clock DH producing pulses of period 10 T.

The number $k$ contained in this counter, indicates the position of the shift register 3 at each moment. A bi-stable flip-flop $B_2$, controlled by the clock DH and by the reception system 6, generates pulses for controlling the stopping of the counting in element $A_k$ whose operation is actuated at the time of arrival of an echo. The recording member 5 is connected to a comparator CN which eliminates the aleatory echoes by comparing the number of echoes received in the assemblies $A'_k$ of member 5 with a threshold value. An element DE receives the signals generated by the comparator CN and determines the presence of the double echoes which characterize the interface between the two substances contained in the cavity. The data recorded by member 4, counter $C_0$ and element DE are transferred to a memory M, not shown, at the end of the each series of I cycles.

Figure 4:
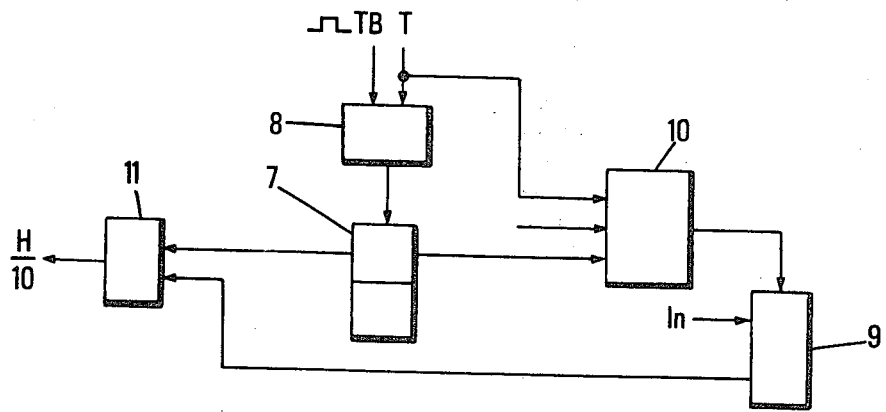

The clock element illustrated in FIG. 4 comprises a bi-stable flip-flop 7 actuated by the signal issued from an AND gate 8, one input of which is connected to element H generating pulses at a frequency T. These pulses are also supplied to a counter 9, reset to zero after every 10 pulses, through an AND gate 10 controlled as also an AND gate 11 by one of the outputs of the bi-stable flip-flop 7. The output of counter 9 is connected to a second input of the AND gate 11. At a starting time, the counter 9 is reset to zero by a control signal $I_n$ and the gate 8 is opened by a control pulse TB. The state of the flip-flop controls the opening of the AND gates 10 and 11, the transfer of the pulses T to the counter 9 and the production of the reference signal 10 T through the AND gate 11.

Figure 5:
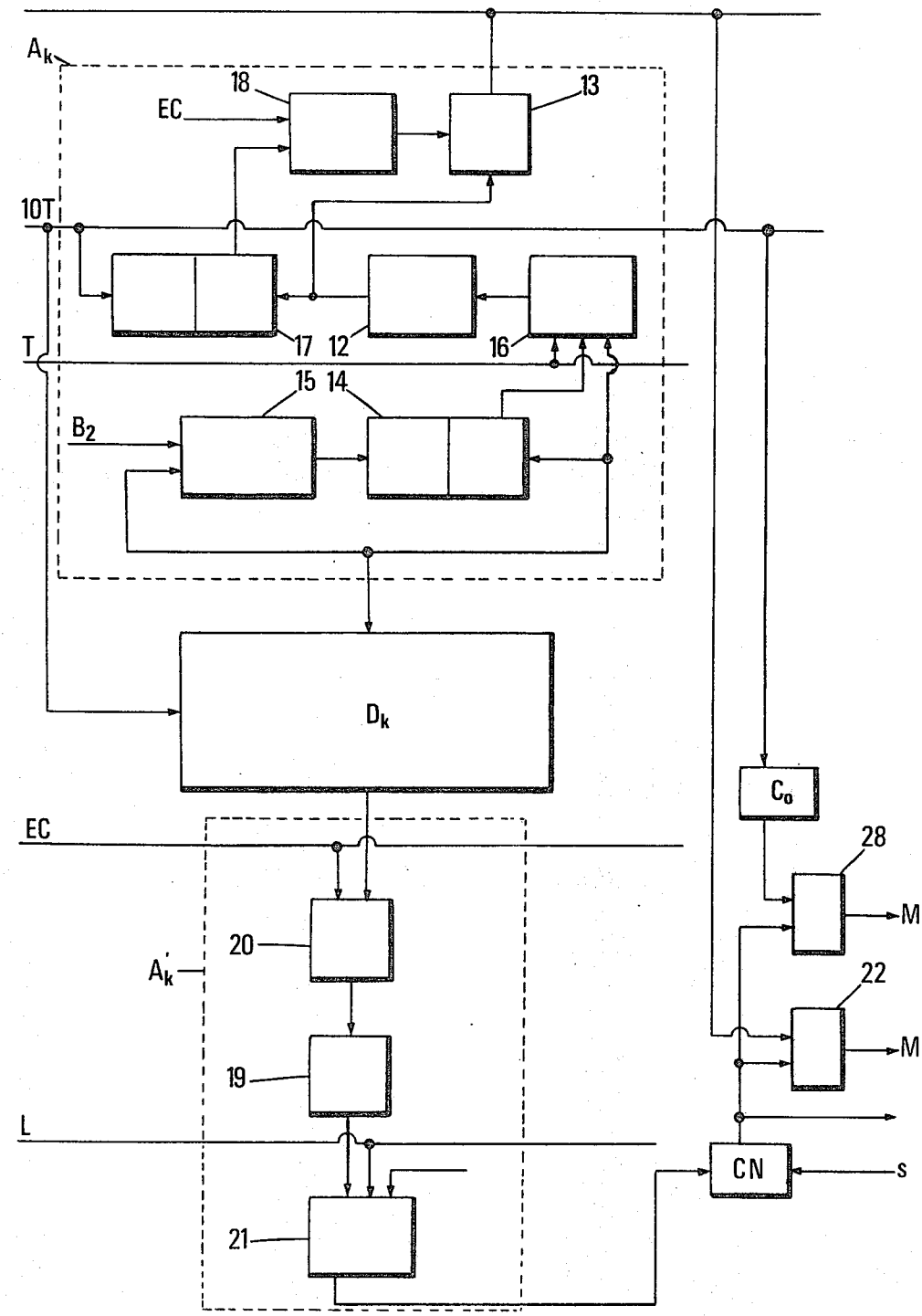

Each of the assemblies $(A_1, A_2 \ldots A_k \ldots A_p)$ of the counting member 4 comprises, as the assembly $A_k$ shown in FIG. 5, two counters 12 and 13 connected in series and identical assemblies of control and validation elements as hereinafter defined. A bi-stable flip-flop 14 receives on a first input, the signal transmitted from the flip-flop $B_2$ (see FIG. 3) through an AND gate 15 controlled by an actuation signal supplied from element $D_k$ of the shift register 3, when said element is actuated by the $k^{th}$ pulse of period 10 T. This validation signal is also used for actuating the flip-flop 14 on another input as well as for controlling an AND gate 16 which receives, on both inputs, pulses of period T and the signal produced by the flip-flop $B_2$ at one of its outputs. The output of the AND gate 16 is connected to the input of counter 12. Both inputs of a bi-stable flip-flop 17 are connected, one to the output of counter 12, the other to the output of the clock element DH producing pulses of period 10 T. An AND gate 18 receives on both inputs the signal supplied by the bi-stable flip-flop 17 on one of its outputs and the signal EC produced by element 6 (see FIG. 3) when an echo is detected.

This AND gate 18 produces a signal authorizing the transfer of one unit to the associated counter 13, at each time when the number contained in the counter 12 exceeds the capacity thereof. An AND gate 22 authorizes the transfer of the content of counters 12 and 13 into the memory M upon actuation by a signal produced by the comparator. Each of the $p$ assemblies of member 5 for recording the number of detected echoes comprises, as the shown assembly $A'_k$, a counter 19 and validation elements as hereinafter described. An AND gate 20 controlled by the actuation pulse transmitted from element $D_k$ of the shift register, when said element is actuated by the $k^{th}$ pulse of period 10 T, authorizes the transfer to counter 19 of the echo signal EC produced by the element 6 (see FIG. 3). An AND gate 21, also controlled by the actuation pulse produced by the element $D_k$, authorizes the transfer of the content of counter 19 to the comparator CN. An AND gate 28, controlled by a signal issued from the comparator CN, authorizes the transfer of the content of the counter $C_0$ to the memory M. The operation of the device is hereinafter explained with the assumption, for sake of clarity, that the period T is, for example, 1 ms.

For measuring the distance $d_{n,m}$ corresponding to a section $m$ and an angular position $n$ of the measuring sonde, there are performed I cycles of transmission-reception and I different measurements of the travel time of the sonic waves.

From a starting time $t_0$ of a transmission cycle, the shift register 3 receives pulses of period 10 T, equal to 10 ms. The elements $D_1, D_2 \ldots D_k \ldots D_p$ of register 3 are successively actuated every 10 ms and successively validate the assembly couples $(A_1, A'_1) \ldots (A_k, A'_k) \ldots (A_p, A'_p)$ of members 4 and 5.

For any couple of the assemblies $(A_k, A'_k)$, two operating modes are possible, depending on the detection or not of an echo during the time interval where they are validated by element $D_k$.

As long as no echo is detected, the flip-flop $B_2$ (see FIG. 3), actuated by pulses of period T, generates a signal which opens gate 15 of the assembly $A_k$. The signal produced by element $D_k$, upon actuation of the latter, actuates the flip-flop 14, which authorizes the transfer of pulses of period T to the counter 12, through the AND gate 16. When the number of accrued pulses exceeds the capacity of the counter 12, the latter generates a so-called "overfull" pulse which actuates the flip-flop 17. In the absence of echo, the AND gate 18 is kept closed and the overfull pulse cannot be recorded in the association counter 13.

The detection of an echo results in the closure of the AND gate 15 upon actuation by flip-flop $B_2$, the triggering of the flip-flop 14, the closure of the AND gate 16 and, consequently, the counting discontinuation of pulses of period T by counter 12. The opening of the AND gate 18 by an echo signal EC authorizes the transfer of an overfull pulse, if any, to the associated counter 13.

The detection of an echo operates the opening of the AND gate 20 and the counting of a pulse in the recording counter 19.

Each cycle of transmission-reception extends over a period 10 $p$T, during which, the elements $D_1, D_2 \ldots D_k \ldots D_p$ of the shift register are successively actuated. If other echoes occur during each cycle, they are recorded in the order of their times of arrival on the different assemblies of members 4 and 5.

Figure 6:
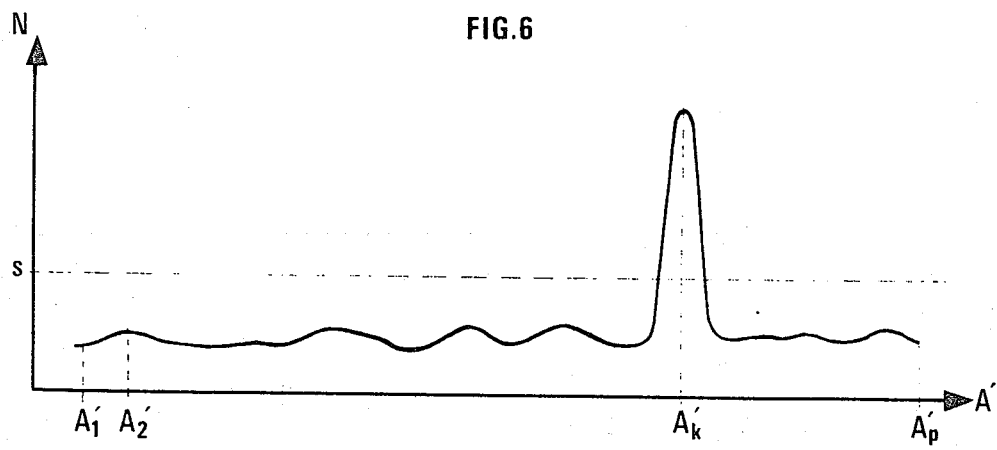
FIG. 6 is the curve which represents the received echoes as a function of the propagation time.
Figure 7:
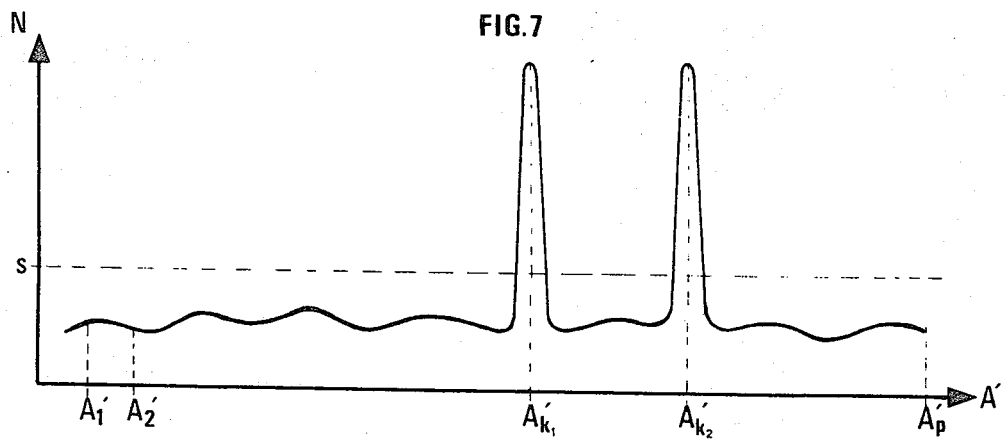
FIG. 7 shows a curve representing the received echoes as a function of the propagation time, when the sonde is placed in the vicinity of the surface separating the two substances.

The most part of the echoes recorded during one cycle are not significant and correspond to parasitic reflections in the medium wherethrough the waves propagate. In order to separate the echoes on the surface of the cavity from the parasitic reflections, there are performed several cycles (I cycles) of successive transmission-reception for a given position of the sonic sonde, in view of the fact that the parasitic echoes are aleatory and will not be reproduced with the same frequency as the significant echoes. The counters 19 of the assemblies $A'_k$ register and sum up, during the successive cycles, the number of echoes received during the time intervals where they are respectively validated. At the end of the I cycles, the number of echoes registered by counter 19 of assembly $A'_k$, for example, is much greater than that registered by the other assemblies (FIG. 6). At the vicinity of the interface between the two media, there is observed a noticeable increase of the number of echoes registered by the counters of two different assemblies $A'_{k_1}$ and $A'_{k_2}$ (FIG. 7).

The elimination of the false echoes is performed by comparing the number of accrued echoes in each counter 19 of the assemblies $A'_k$ with a pre-set threshold value S, at the end of I successive cycles. For this purpose, there is performed a supplementary cycle without transmission and the gates 21 of each assembly $A'_k$ are released by a signal L. The validation signals, successively transmitted by the elements of the shift register during the supplementary cycle, successively order the transfer of the numbers contained in the different counters 19 to the comparator CN, through the AND gates 21. If the number of echoes contained in counter 19 is greater than the threshold value S, the content of the latter is transferred to a memory together with the time indication corresponding to the average time interval between the transmission and the reception of the sonic pulses transmitted into the cavity.

This average time interval, corresponding to N pulses of period T, is determined by the average value registered by counter 12 and 13 in each assembly $A_k$ and by the value indicated by counter $C_0$ at the time at which the number contained in counter 19 is compared with the threshold value. The counters 12 and 13 of each assembly $A_k$ have accumulated the added propagation times of the pulses whose echoes have been registered during successive cycles by the associated assembly $A'_k$. Accordingly, there is obtained the average time interval by dividing the content of each assembly of counters 12 and 13 by the number of detected echoes. In order to simplify this operation, the number I of performed cycles will be so chosen that the number of real echoes above the threshold value be equal to a whole power of number 2. In such a case, the counters 12 and 13 may then consist of binary coded decimal counters and the division of their content by the number of echoes may be performed in a simple manner through mere shifting by one or more binary rows. The obtained average value is then transferred to the memory through gate 22. The echo validation signal transmitted by the comparator also controls the transfer of the content of the counter $C_0$ to the memory through a gate 28.

A device, not shown, converts the time indications in term of distance and computes the time interval $\Delta\tau$ in accordance with relationship 2, being known the velocity of the sonic waves through each of the two media contained in the cavity.

Figure 8:
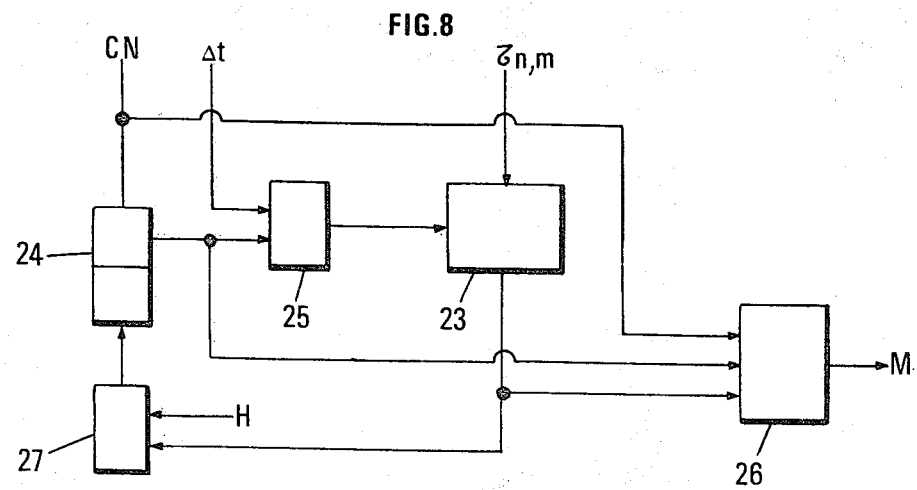
FIG. 8 shows the system for detecting the position of the surface separating the two substances by correlating the received echos.

The device also comprises a system, shown in FIG. 8, whereby there can be determined, in the case of double echoes, whether the time interval between them is equal or substantially equal to the time interval $\Delta\tau$ (see relationship 2).

This system comprises a counter 23, a bi-stable flip-flop 24, one output of which is connected, on the one hand, to the subtracting input of said counter through an AND gate 25 and, on the other hand, to one of the inputs of an AND gate 26. The output of counter 23 is connected to a second input of gate 26 and to a first input of an OR gate 27 whose second input receives from element DH (FIG. 3) pulses at the period T. The output of said OR gate is connected to one of the inputs of the bi-stable flip-flop 24. The output of comparator CN, producing echo validation signals, is connected, on the one hand, to a second input of flip-flop 24 and, on the other hand, to a third input of the AND gate 26.

In the case where the velocity $c_2$ of the waves through substance $L_2$ is greater than the velocity $c_1$ through substance $L_1$, the first echo detected by the comparator corresponds to the sonic pulses which were propagated partially through substance $L_2$ and the corresponding travel time is the following:

$$\tau_{nm} = \frac{2\,d_{nm}}{c_2} = NT,$$

when the axis of the transmission beam is at the level of the interface. The second echo detected by the comparator is delayed with respect to the first one by a time interval at most equal to $\Delta\tau$, (see relationship 2).

The detection of the interface location will be carried out by checking that the real time interval between the two echoes is just equal to $\Delta\tau$.

This above-defined value $\tau$ nm, is introduced in counter 23 and read in the corresponding assembly $A_k$ of member 4, and the second input of the AND gate 25 is connected to an element, not shown, producing a signal of a period:

$$t = \frac{\Delta\tau}{\tau_{nm}}\,T = \frac{c_2 - c_1}{c_1}\,T \qquad (4)$$

The signal corresponding to the first echo, separated by the comparator, triggers the flip-flop 24 which opens the gate 25 and authorizes the counting of the value introduced in counter 23 by the signal of period $\Delta t$. If the second echo signal, separated by the comparator, is concomitant with the pulse produced by the counter 33 when indicating a zero value, a signal indicating the detection of the interface is transmitted through the AND gate 12 and therefrom to memory M.

The memory may be adapted to the method of processing the selected data. In the case of a processing in real time, there will be selected a so-called "alive" electronic memory. For a processing at differred time, the data will be recorded on magnetic tape or any other support.

Other embodiments of the method and of the device for carrying out the same may be contemplated without departing from the spirit and the scope of the present invention as more generally defined in the appended claims.

What I claim is:
1. A device for determining the shape of a cavity containing at least one substance comprising:
   a. means for transmitting a sequence of acoustic pulses along each of successive transmission axes from reference locations within the cavity in the direction of places of the wall of said cavity;
   b. means for detecting echoes of the acoustic pulses received along each of said transmission axes between the transmission of any two acoustic pulses of the sequence;
   c. means for selecting a plurality of echoes within a propagation time interval between two successive transmissions and substantially unchanged for each of the acoustic pulses transmitted along each of said axes; and
   d. means for measuring the average propagation time interval of the selected echoes.

2. A device for determining the shape of a cavity containing at least one substance comprising:
   a. means for transmitting a sequence of acoustic pulses along each of successive transmission axes from reference locations within the cavity in the direction of places of the wall of said cavity;
   b. means for detecting echoes of the acoustic pulses received along each of said transmission axes;
   c. means for measuring the propagation time interval of the echoes received during a succession of constant time intervals progressively shifted with respect to each acoustic pulse transmission time between the transmission of any two acoustic pulses;
   d. means for selecting, after completion of said sequence of acoustic pulses transmitted along each transmission axis, the echoes received during each of said constant time intervals, the number of said echoes exceeding one; and
   e. means for measuring the average propagation interval of the selected echoes.

3. A device for determining the shape of a cavity containing at least one substance comprising:
   a. means for transmitting a sequence of acoustic pulses along each of successive transmission axes from reference locations within the cavity in the direction of places of the wall of said cavity;
   b. means for detecting along each of said successive transmission axes, between two successive transmissions, the echoes of the transmitted acoustic pulses;
   c. means for registering and counting the respective number of received echoes, after completion of said sequence, during each time interval of a series of constant detection time intervals shifted with respect to one another between the transmission of any two acoustic pulses;
   d. means for determining the propagation time corresponding to the echoes received during each detection time interval;
   e. means for validating the echoes received during each detection time interval when their number is greater than a reference value; and
   f. means for determining the average propagation time interval of the validated echoes.

4. A device for determining the shape of a cavity containing two different substances comprising:
   a. means for transmitting a sequence of acoustic pulses along each of successive transmission axes from reference locations within the cavity in the direction of places of the wall of said cavity;
   b. means for detecting between two successive transmissions the echoes of the transmitted acoustic pulses along each of said transmission axes;
   c. means for registering and counting the respective number of received echoes, after completion of said sequence, during each time interval of a series of constant detection time intervals shifted with respect to one another;
   d. means for determining the propagation time corresponding to the echoes received during each detection time interval;
   e. means for validating the echoes received during each detection time interval when their number is greater than a reference value;
   f. means for determining the average propagation time interval of the validated echoes; and
   g. means for comparing the time interval between the reception of validated echoes, received during two different detection time intervals, with a value proportional with the average propagation time interval corresponding to echoes received during a first detection time interval with a proportionality coefficient depending only on the velocity of the acoustic pulses through the two substances.

5. A device for determining the shape of a cavity containing at least one substance comprising:
   means for performing a plurality of transmissions of timely shifted sonic signals from a series of reference locations within the cavity, in the direction of different successive places of the wall of said cavity;
   means for receiving, between two successive transmissions, the echoes of the transmitted sonic signals;
   means for registering and counting the respective number of received echoes, after completion of the plurality of measurements, during each time interval of a series of constant detection time intervals shifted with respect to one another;
   means for determining the propagation time corresponding to the echoes received during each detection time interval;
   means for sequentially controlling said registering and counting means and the means for determining the propagation time corresponding to each received echo;
   means for validating the echoes received during each detection time interval when their number is greater than a reference value; and
   means for determining the average propagation time interval of the validated echoes.

6. A device according to claim 5, wherein said sequentially controlling means comprises means for producing a sequence of control signals, a system for generating at least a first signal consisting of pulses defining a time scale and means for transferring said signal to the means producing the control signals at the beginning of each measurement of said propagation time intervals.

7. A device according to claim 6, wherein the means for determining the propagation time, corresponding to the echoes received during each detection time interval, comprises a plurality of counting systems sequentially controlled by the means producing control signals and a control assembly actuated by said control signal producing means, for transferring to the counting system a second signal consisting of pulses at a frequency multiple of that of the first signal and defining a second time scale.

8. A device according to claim 7, wherein each counting system comprises two counters connected in series and wherein said control assembly comprises means for controlling the successive summing up of the propagation time intervals of the detected echoes during each detection time interval.

9. A device according to claim 8, wherein the control means comprises a logic system, actuated by the means for receiving the echoes of the transmitted signals, for authorizing the transfer of the content from the first counter to the second counter, when the number of pulses of said second signal contained in the first counter, exceeds the capacity thereof.

10. A device according to claim 5, wherein said means for registering and counting the echoes received during each detection time interval, comprises a counting element and controlling means operated by the means for receiving the echoes of the transmitted signals.

11. A device according to claim 6, in which said means for determining the propagation time corresponding to the echoes received during each detection time interval, comprises a counting element connected to the means for generating the first signal defining a time scale.

12. A device according to claim 5, wherein said validating means comprises a comparison unit and means for sequentially transferring thereto, after completion of the plurality of measurements, the number of echoes detected by the means for registering and counting the number of echoes received during each time interval.

13. A device according to claim 12, wherein said comparison means comprises a comparison unit and means for sequentially transferring thereto, after completion of the plurality of measurements, the number of echoes detected by the means for registering and counting the number of echoes received during each time interval, and wherein said means for determining the average propagation time interval of the echoes comprises a member controlled by the comparison unit, for dividing the propagation time corresponding to the received echoes by the number of said echoes when said number is greater than a predetermined value, and comprising means for transferring, upon actuation by the comparison unit, the values contained in the dividing member and in the second counting system to a memory unit.

14. A device according to claim 13, wherein said means for determining the average propagation time interval of the echoes comprises a member controlled by the comparison unit, for dividing the propagation time corresponding to the received echoes by the number of said echoes when said number is greater than a predetermined value.

15. A device according to claim 4, wherein said system comprises an element for counting a value equal to the average propagation time of the first detected echo, means for generating a signal whose period depends only on the propagation velocity of the sonic pulses through the two substances, means for sequentially controlling the transfer of said signal to the counting element and for resetting to zero, the value contained therein, and means for testing whether the resetting to zero of the counting element occurs at the same time of the detection of the second validated echo.

* * * * *